April 13, 1965   J. B. JONES, JR   3,178,163
OFF-GAS COLLECTOR SYSTEM
Filed Sept. 19, 1963   3 Sheets-Sheet 1

INVENTOR.
John B. Jones Jr.
BY
ATTORNEY

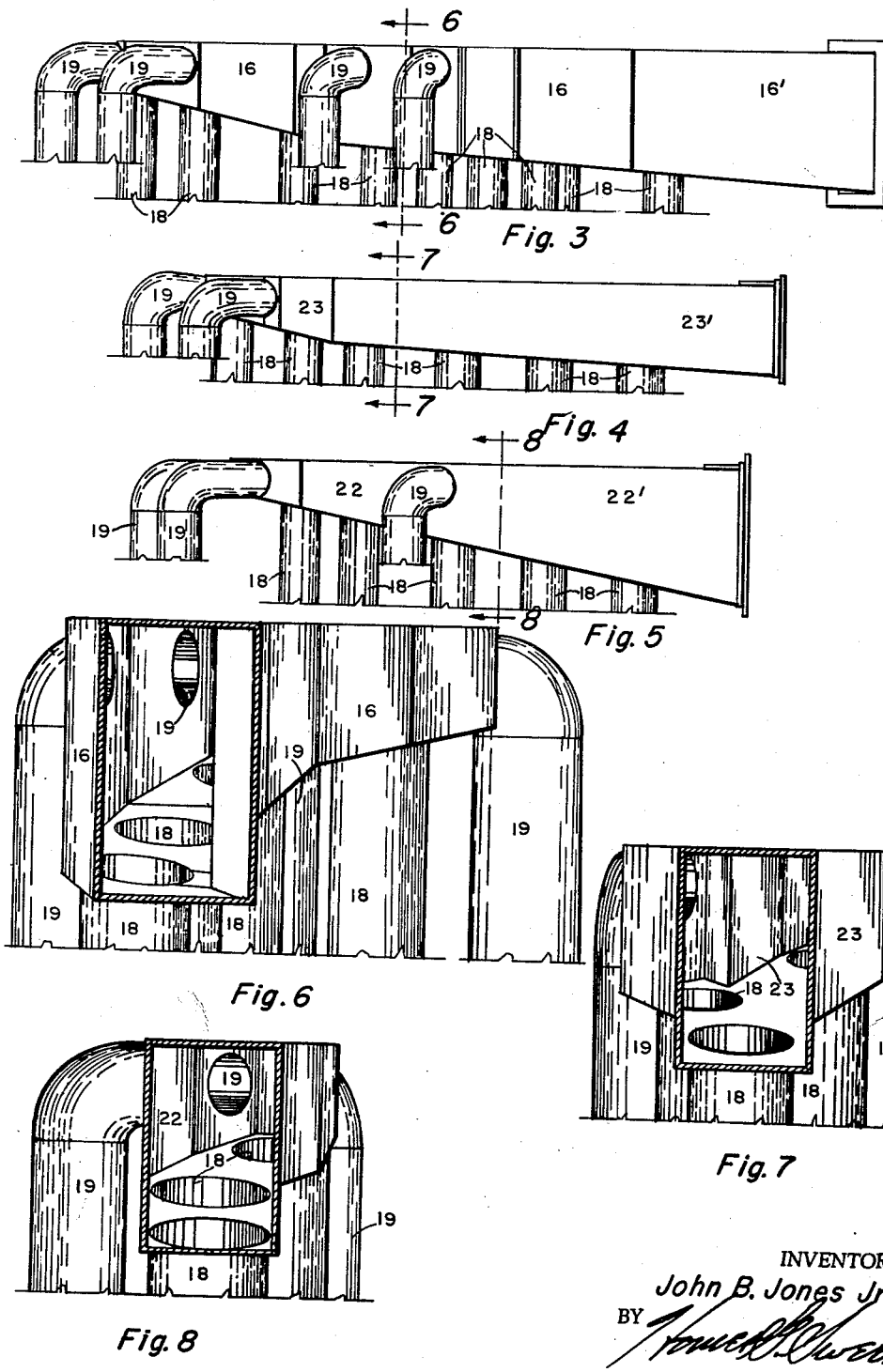

INVENTOR.
John B. Jones Jr.
BY
ATTORNEY

United States Patent Office 3,178,163
Patented Apr. 13, 1965

3,178,163
OFF-GAS COLLECTOR SYSTEM
John B. Jones, Jr., Arapahoe County, Colo., assignor to Cameron and Jones, Incorporated, Denver, Colo., a corporation of Colorado
Filed Sept. 19, 1963, Ser. No. 310,110
19 Claims. (Cl. 263—29)

As a development from and an improvement in certain respects over the disclosures of United States Patent No. 3,061,293, dated October 30, 1962, this invention relates to the art and practice of material treatment in a shaft kiln, and more particularly to such art and practice as featured by collection and salvage of the off-gas products of such treatment, and has as an object to provide novel and improved means constituting a system for collection and salvage of such off-gas products with enhanced efficiency and practical advantage.

A further object of the invention is to provide a novel and improved system effective in association with a shaft kiln to collectively subduct the off-gas products of kiln operation with concomitant promotion of uniform gas flow velocities through and at the intakes of such system.

A further object of the invention is to provide a novel and improved system effective in association with a shaft kiln to collectively subduct the off-gas products of kiln operation with concomitant promotion of a uniform pressure differential between the intake supply to and the interior of such system.

A further object of the invention is to provide a novel and improved system effective in association with a shaft kiln to collectively subduct the off-gas products of kiln operation with concomitant promotion of pressure uniformity transversely and interiorly of the kiln served thereby.

A further object of the invention is to provide a novel and improved system effective in association with a shaft kiln to collectively subduct the off-gas products of kiln operation with minimal deposition therein of gas-entrained matter.

A further object of the invention is to provide a novel and improved system effective in association with a shaft kiln to collectively subduct the off-gas products of kiln operation that is susceptible of expedient renovation at need.

A further object of the invention is to provide a novel and improved system effective in association with a shaft kiln to collectively subduct the off-gas products of kiln operation that is adaptable to use with kilns of diverse size, shape, and structural particularity.

A further object of the invention is to provide a novel and improved construction, correlation, and operative organization of elements and features constituting an efficient off-gas collector system for supplementing coaction with a shaft kiln.

A further object of the invention is to provide a novel and improved off-gas collector system for shaft kilns that is practical of production and use installation, advantageously supplemental to an extensive range of specific kiln operations, and positive and efficient in attainment of the ends for which designed.

With the foregoing and other objects in view, my invention consists in the construction, arrangement, and operative combination of elements as hereinafter set forth, pointed out in the appended claims, and illustrated by the accompanying drawings, in which:

FIGURE 3 is a side elevational view, on a slightly-enlarged scale, of one of the header components of the system represented by the preceding views as detached from its operative associations.

FIGURE 4 is a side elevational view, similar to and on the same scale as FIGURE 3, of a second header component of the system represented by FIGURES 1 and 2 as detached from its operative associations.

FIGURE 5 is a side elevational view, similar to and on the same scale as FIGURE 3, of a third header component of the system represented by FIGURES 1 and 2 detached from its operative associations.

FIGURE 6 is a transverse section, on a relatively-enlarged scale, taken substantially on the indicated line 6—6 of FIGURE 3.

FIGURE 7 is a transverse section, on a relatively-enlarged scale, taken substantially on the indicated line 7—7 of FIGURE 4.

FIGURE 8 is a transverse section, on a relatively-enlarged scale, taken substantially on the indicated line 8—8 of FIGURE 5.

Shaft kilns are extensively utilized in a variety of shapes, sizes, and particular constructions for the treatment of discrete solid materials received therein for gravity transit therethrough in exposure to countercurrent uprise of gases. Incident to such treatment the gases permeate the charge of solid material to condition the latter, as desired, for recovery and effuse through the upper surface of the charge as an off-gas product of the treatment frequently qualified for collection and recovery for direction to further processing or reuse. Significant to satisfactory and efficient shaft kiln treatment operations are infeed of solid material charge with avoidance of particle size segregation and peaking or piling within the receiving vessel, prompt and effective collection of off-gas output from the entire upper surface area of the charge, dependably uniform dispersion and circulation of the input gas throughout the body of the charge, and, in situations marked by entrainment with the off-gas of particles and constituents readily separable from the gas flow, mitigation of deposit accumulations in the path of off-gas flow with provision for deposit removal when requisite. The noted considerations anent infeed of charge and collection of off-gas output have been hitherto quite adequately resolved in a manner and by means readily adaptable to promote the further capabilities just suggested, and the instant invention is hence directed to the provision of a novel and improved off-gas collector system qualified to functionally satisfy all of the prerequisites for efficient operation of a kiln equipped therewith.

Figure 2:
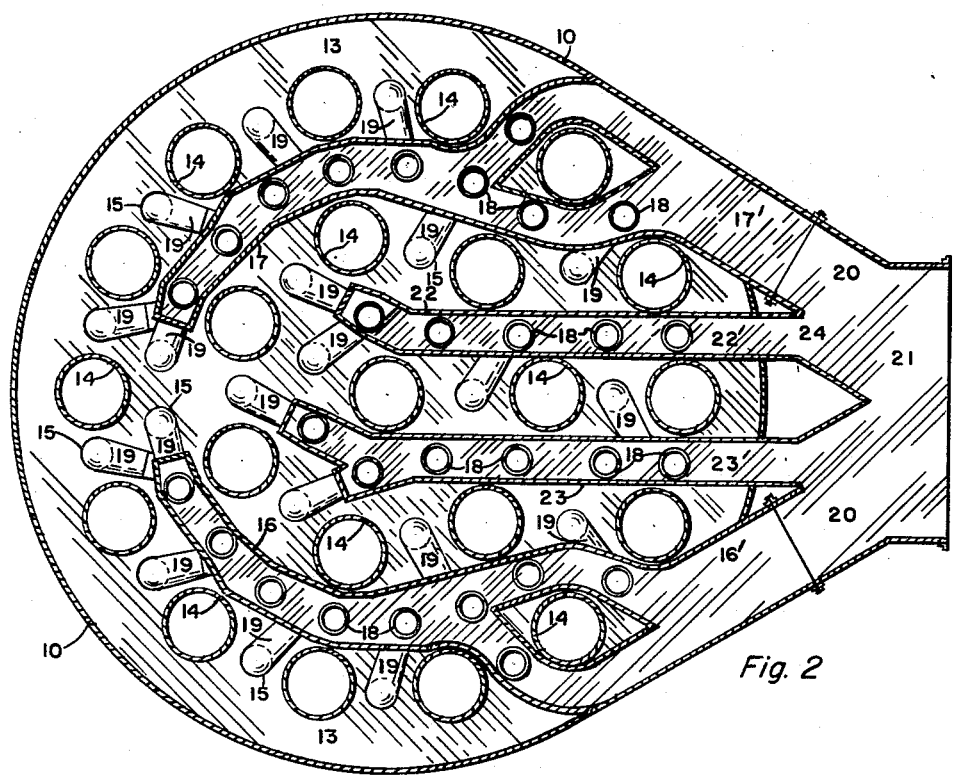
FIGURE 2 is a section transversely through the arrangement according to FIGURE 1 taken substantially on the indicated line 2—2 of the latter view.
Figure 1:
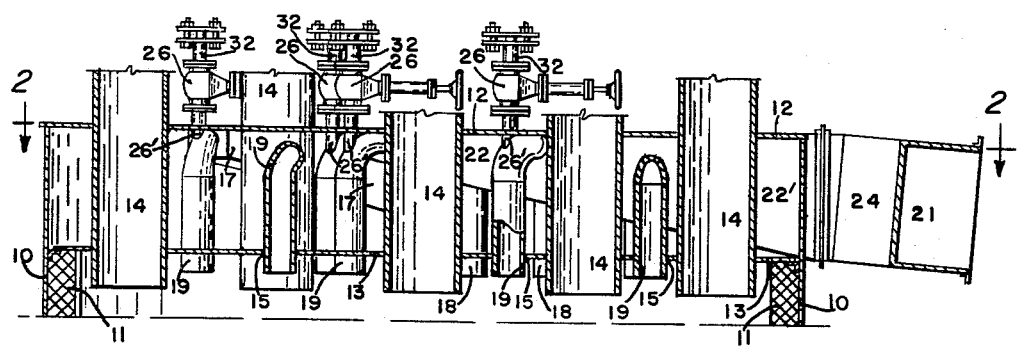
FIGURE 1 is a vertical section taken diametrically through the upper end of a conventional circular shaft kiln as typically organized in accordance with and to give effect to the principles of the instant invention, features of the assembly not essential to an understanding of the improvement being omitted.

As represented by FIGURES 1 and 2 typifying the disclosures of the patent above identified, it is known to close the upper end of an upright shaft kiln, of any expedient size and transverse outline, having a shell wall 10 supporting a refractory liner 11, by means of a coextensive collecting chamber defined between spacedly-parallel, horizontal plate members 12 and 13 marginally sealed to an upward extension of the wall 10 and to effect infeed of charge to the shell interior through a plurality of conduits 14 traversing the collecting chamber in intersecting engagement with the members 12 and 13 to deliver below the lower member 13 and out of communication with the collecting chamber in a spaced relation appropriating the effective lateral charge area of the shell 10. Thus organized, the collecting chamber established between the members 12 and 13 is qualified by means of openings 15 through the lower member 13 between the several conduits 14 to receive and collect off-gas uprise from the kiln charge for such directed delivery thence as may be preferred.

Designed and at least theoretically effective to provide uniform infeed of charge and uniform extraction of off-gas in a manner to accommodate efficient dispersion and circulation of input gas uprising through the body of the charge, the arrangement described as exemplary of known practice is in such latter respect less than adequate to sustain desired efficiency of certain kiln operations, whence derives occasion for the system conjunctively supplementing the described known practice of off-gas collection as hereinafter set forth.

FIGURES 1 and 2 represent the system of the invention as applied to operative association with a conventional, transversely-circular shaft kiln furnished with an off-gas collecting chamber at its upper end traversed by a spaced array of twenty-two feed conduits 14 and served for the reception of off-gas uprise from the kiln charge by forty-nine like circular openings 15 intersecting the lower member 13 of the collecting chamber about and between said conduits in and as an array substantially coextensive with the area of said member characterized by approximately-equal separation of its components. In a functional modification and structural adaptation of the environment exemplary of known practice illustrated and thus far described, the concept of the present invention substitutes for the capacious collecting chamber fully open to input through any and all of the openings 15 a system of headers arranged in flow communication with and to receive the gas input through all of the openings 15 for delivery to a common outflow duct in a manner to effectuate the purposes and realize the advantages of the improvement. Susceptible of wide variation as to conformation and structural particularity in adaptation to kilns of differing size and shape, the header and duct organization primary to the system of the invention conduces in use to and promotes uniformity of gas input velocity at and through the many openings 15, uniformity of pressure differential between the intake supply to and the interior of the system, uniformity of pressure obtaining transversely and interiorly of the associated kiln, and minimization of deposition from the gas flow therethrough, each and all of which ensue during use of the system in consequence of a unique proportioned organization and correlation of the header and duct structures comprised in a specific adaptation of the system. Whatever may be the characteristics of the use environment to which the system is applied, such as the shape and size of the kiln, the number and size of the openings 15, and the like, an effective application of the system will include a number and conformation of headers suited for connection of every one of the intake openings 15 in full flow communication with one or another thereof, a flow capacity of each header such as to fully receive and accommodate without adverse pressure restriction the input thereto from each of the intakes with which it connects and to evidence, in consequence, a uniform interior pressure compatible with accommodation of input of each of said intakes, and an output capacity in connection with the outflow duct proportioned to that of its complements to effect therewith a combined delivery of uniform pressure and velocity receivable without restriction within a duct of correspondingly-proportioned capacity.

Exemplifying one practical embodiment of the improved system in operative adaptation to the use environment of known practice typified by FIGURES 1 and 2, counterpart headers 16 and 17, alike save as to reverse curvature in plan aspect, are formed substantially as shown in FIGURES 3 and 6 of suitable material and in any appropriate manner to transverse rectangular shape in a length and irregular longitudinal curvature effective for engagement between and about the outwardly-disposed conduits 14 of the array at each side of the collecting chamber in position to each overlie nine of the openings 15 between said conduits and to connect in flow communication with each thereof through tubes 18 fixed therebetween. Conformed as shown for accommodation about and between contiguous conduits 14 of the array serving the kiln, the headers 16 and 17 similarly adjoin seven others of the openings 15 laterally spaced therefrom in a proximity suiting them for individual connection in flow communication with the adjacent header by means of elbow tubes 19 appropriately curved to open to the interior of the header through the end and side walls thereof, whereby to qualify each of the headers 16 and 17 to receive and collect the off-gas uprise obtaining through sixteen of the openings 15. However specifically conformed in connection with and to collect the delivery from any given number of openings 15, the headers 16 and 17 are progressively enlarged through increase in width and depth, either or both, from a lesser closed end to correspondingly establish therewithin a volumetric capacity substantially equivalent at any and every transverse area of the header to the total input capacity of the tubes 18 and 19 serving the length portion of the header anterior, in the direction of gas flow, to such area, whereby to qualify the header to receive, collect, and transmit the input flow from each and all of the openings 15 connected for delivery thereto with a consequent uniform pressure reaction interiorly of the header effective without impairment of input from any of said openings to accomplish the purposes of the invention hereinabove noted. Connected as shown and described to cumulatively transmit the input from sixteen of the openings 15, each of the headers 16 tnd 17 is progressively enlarged as it connects away from its lesser closed end with successive such openings to an ultimate flow capacity approximately sixteen times that of one of the openings 15 obtaining in and through an open-end discharge throat 16' and 17', respectively, each connected with and for delivery through one of the divergent intake arms 20 of a duct 21. In corresponding manner and with functional equivalence the openings 15 not amenable to connection with the headers 16 and 17 are engaged by means of tubes 18 and 19 with and for input to additional headers organized in capacities proportioned to the input as above set forth and conformed to traverse the array of conduits 14 as the exigencies of the installation may determine. Given the typical organization represented by FIGURES 1 and 2 it is feasible to provide a generally-straight, terminally-bent header 22 arranged parallel to a diameter of the kiln between the headers 16 and 17 to overlie five of the openings 15 connected thereto by tubes 18 and to connect through elbow tubes 19 with three others of the openings for a total input determining a flow capacity for the discharge throat 22' of the header eight times as great as that of one of the openings, and to dispose a complementary, generally-straight, terminally forked header 23 spacedly parallel to the header 22 in overlying connection through tubes 18 with six of the openings 15 and flow communication with the remaining three openings of the array by means of elbow tubes 19 for a total input determining a flow capacity for its discharge throat 23' nine times as great as that of one of the openings 15. The off-gas input to the headers 22 and 23 is added to and combined with that collected in the headers 16 and 17 through connection of the header throats 22' and 23' with intake arms 24 serving the duct 21 between the intake arms 20 in an individual flow capacity the same as that of the associated throat, significant to which arrangement is the provision of the duct 21 proportioned to a flow capacity equivalent to that of the combined delivery thereto from the header throats 16', 17', 22' and 23'.

As should be adequately apparent, the system typified by the headers 16, 17, 22, 23, and the duct 21 in the correlation and operative association with a shaft kiln shown and described promotes subduction from the kiln of the collected off-gas output thereof with substantial uniformity of gas uprise through the separate like outlets therefor provided, with a uniformity of pressure manifest interiorly of the headers and duct that obviates impedance of such uprise at individual such outlets, and with consequent maintenance of a uniform pressure differential between the interior of the collecting system and the transverse zone of the kiln subjacent thereto. Functionally characterized as noted to enhance the efficiency of conventional shaft kiln operations, the system herein exemplified is applicable, when desired, to stimulate extraction of the off-gas products of kiln operations, since but obvious and simple adaptations will suffice to maintain within the duct 21 a condition of reduced pressure, as by means of an exhaust blower, or the like, reactive through the system with suction effect reflected by enhanced velocity of off-gas subduction therethrough.

Figure 9:
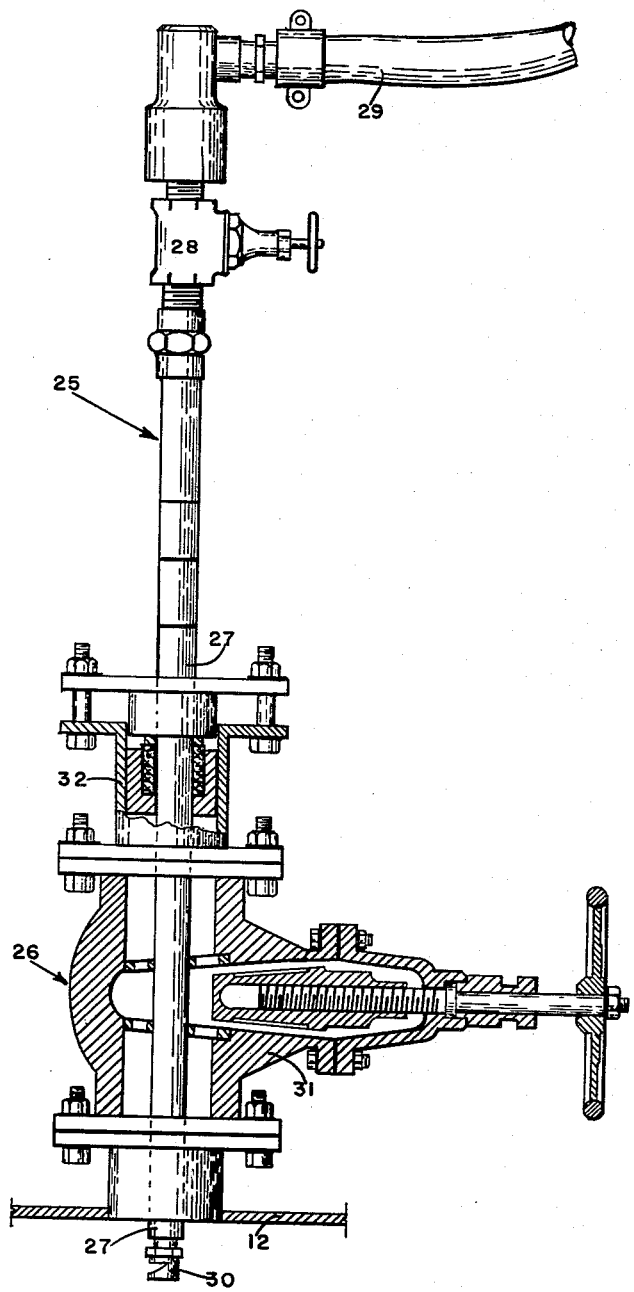
FIGURE 9 is an elevational view, partly in section and on a further-enlarged scale, of a renovating lance optionally applicable, as illustrated, in coaction with features of the invention to recondition components of the system when needful.

Inherently capable of minimizing disposition therein of matter entrained with the off-gas output from kilns wherewith it is utilized, the improved system of the invention is naturally subject to some fouling by interior accumulations of entrained matter present in varying concentrations and kind in the off-gas products of shaft kiln operations, in recognition whereof the instant invention includes the association with the collecting system as hereinabove set forth of practical means available at option to effectively renovate the features of the system exposed to such fouling. Susceptible of wide variation as to structural organization and specific detail, the means optionally applicable to renovate the features of the improved system comprise a manipulable lance assembly 25 arranged to effect regulable ejection of fluid under pressure and valve-controlled nozzles 26 adapted and disposed in fixed association with the features of the system to selectively accommodate intended use of such lance where appropriate for expedient conditioning of the system. As exemplified by the showing of FIGURE 9, the lance assembly 25 may be constituted as a straight, elongated, tubular member 27 of moderate, uniform diameter connected at one end through a regulating valve 28 with a flexible line 29 leading from a source or supply of fluid under pressure, such as air, steam, water, or the like, and furnished at its other end with a laterally-directed outlet 30 suited for jet delivery of fluid supplied to the member 27, and the nozzles 26 accommodating intended use of the lance assembly may feasibly have the form of a conventional gate valve 31 sized to freely pass, when open, the member 27 axially and fully therethrough when and as said member is entered through a stuffing box 32 coaxially carried by one end of the valve 31 for revoluble and reciprocable coaction with the member in a usual manner. The nozzles 26 are fixed to upstand in suitable number and at desired locations from the upper plate member 12 closing the collecting chamber of the kiln in registration with openings through said plate member which provide access for the lance assembly 25 therethrough, a practical and effective arrangement of said nozzels being such as to align the axes thereof for projection to registration with the centers of the openings 15, whereby certain of the nozzels open to and communicate directly with the interiors of the headers 16, 17, 22, and 23 in opposed registration with the ends of the tubes 18 connected for delivery to the headers and others of the nozzles open through nipples 26' to the elbow tubes 19 in concentric registration with the openings 15 served by the latter, it being manifestly feasible and within the contemplation of the invention that additional nozzles 26 may be applied as desired out of registration with any opening 15 to establish access for the lance assembly 25 to the headers, intake arms, and ducts of the system wherever renovation may be deemed, or found, to be needful. Installed as represented by FIGURE 1 and above described, all of the nozzles 26 are normally closed by means of their valves 31 to qualify the system of the invention for operation as previously explained, occasion for renovation of the system, in whole or in part, being satisfied with the lance assembly 25 available in connection with a source or supply of suitable fluid under pressure by engagement of the said assembly in and through the stuffing box 32 and opened valve 31 of a selected nozzle 26, adjustment of the assembly valve 28 to effect ejection of pressurized fluid from the outlet 30 within the feature of the system served by the selected nozzle, reciprocation and rotation of the lance assembly in its guided relation with the stuffing box for direction of its fluid jet output against and with cleaning effect upon the contiguous surfaces of the system feature, retraction of the lance assembly from the nozzle with coincident closing of the nozzle valve 31, and repetition of such procedure at selected others, or all, of the nozzles 26. Renovation of the system in the manner and by the means provided is expediently applicable during intended operation of the kiln and the system associated therewith, whereby accumulations dislodged by the jet output of the lance assembly are subjected to the influence of the off-gas flow through the system and therewith entrained to removal by way of the duct 21.

Since changes, variations, and modifications in the form, construction, and arrangement of the elements and features shown and described may be had without departing from the spirit of my invention, I wish to be understood as being limited solely by the scope of the appended claims, rather than by any details of the illustrative showing and foregoing description.

I claim as my invention:

1. An off-gas collector system for shaft kilns and the like having an upper end closure transverse of the kiln formed with multiple like openings disposed in spaced apart relation to pass uprise of the vapor products of kiln operation, comprising an array of independent, complementary headers separately connected in flow communication with said openings to receive and accumulate the entire vapor uprise therethrough, each said header being formed with an open and a closed end, and an off-duct connected in flow communication with the open ends of said headers to receive in common the entire vapor output therefrom.

2. An off-gas collector system for shaft kilns and the like having an upper end closure transverse of the kiln formed with multiple like openings disposed in spaced apart relation to pass uprise of the vapor products of kiln operation, comprising an array of independent, complementary headers individually connected in flow communication with groups of said openings to receive and accumulate the vapor uprise therethrough, each said header being formed with an open and a closed end, said header and group associations embracing all of the openings for direction of the entire vapor output from the kiln through the headers, and an off-duct connected in flow communication with the open ends of said headers to receive in common the combined vapor delivery therefrom.

3. An off-gas collector system for shaft kilns and the like having an upper end closure transverse of the kiln formed with multiple openings disposed in spaced apart relation to pass uprise of the vapor products of kiln operation, comprising a plurality of independent, complementary headers superjacent said end closure, each said header being formed with an open and a closed end, tubes individually connecting each of said openings in flow communication with a proximate header, whereby to direct the entire vapor output from the kiln to reception and accumulation within the headers, and an off-duct connected in direct flow communication with the open ends of all of said headers to receive in common the combined delivery therefrom.

4. An off-gas collector system for shaft kilns and the like having an upper end closure transverse of the kiln formed with multiple openings disposed in spaced apart relation to pass uprise of the vapor products of kiln operations, comprising a plurality of independent, complementary headers superjacent said end closure, each of said headers being formed to provide progressively-increasing capacity from a lesser closed end to a greater open delivery end, tubes individually connecting each of said openings in flow communication with a proximate header, whereby to direct the entire vapor input from the kiln to reception and accumulation within the headers, and an off-duct connected in direct flow communication with the delivery ends of all of said headers to receive in common the combined vapor delivery therefrom.

5. An off-gas collector system for shaft kilns and the like having an upper end closure transverse to the kiln formed with multiple openings disposed in spaced apart relation to pass uprise of the vapor products of kiln operation, comprising a plurality of independent, complementary headers superjacent said end closure, each of said headers being formed to provide progressively-increasing capacity from a lesser closed end to a greater open delivery end, tubes individually connecting each of said openings in flow communication with a proximate header, whereby to direct the entire vapor output from the kiln to reception and accumulation within the headers, and an off-duct equivalent in capacity to the combined delivery capacity of the headers connected in flow communication with the delivery ends of all of the latter to receive in common the vapor delivery therefrom.

6. An off-gas collector system for shaft kilns and the like having an upper end closure transverse of the kiln formed with multiple openings disposed in spaced apart relation to pass uprise of the vapor products of kiln operation, comprising a plurality of independent, complementary headers superjacent said end closure, tubes connecting each of said headers in flow communication with individual openings proximate thereto, each of said headers being formed to provide progressively-increasing capacity from a lesser closed end to a greater open delivery end proportioned to reflect the input capabilities of the several tubes as separately connected thereto, and an off-duct equivalent in capacity to the combined delivery capacities of the headers connected in flow communication with the delivery ends of all of the latter to receive in common the vapor delivery therefrom.

7. An off-gas collector system for shaft kilns and the like having an upper end closure transverse of the kiln formed with multiple openings disposed in spaced apart relation to pass uprise of the vapor products of kiln operation, comprising an array of independent, complementary headers separately connected in flow communication with individual openings proximate thereto arranged to receive and accumulate the entire vapor uprise through all thereof, each of said headers being formed to provide between a lesser closed end and a greater open delivery end a proportioned capacity reflecting the input capabilities of the openings as separately and successively associated therewith to manifest at the delivery end thereof the outflow equivalent of the combined input thereto, and an off-duct equivalent in capacity to the combined outflow potential of the headers connected in flow communication with the delivery ends of all of the latter to receive in common the vapor delivery therefrom.

8. An off-gas collector system for shaft kilns and the like having an upper end closure transverse of the kiln formed with multiple openings disposed in spaced apart relation to pass uprise of the vapor products of kiln operation, comprising independent complementary headers correspondingly arrayed in separation superjacent said end closure for individual operative correlation with a group of said openings proximate thereto, each said header having a capacity progressively increased from a closed lesser header end to a maximum approximating at the open other end of the header the combined input capabilities of the openings grouped for association therewith, tubes individually connecting each of the openings of a header-served group in flow communication with the proximate header for consequent reception and accumulation of the entire vapor uprise through all of said openings within the headers, the tubes serving each group of the openings connecting with the associated header in a succession and proportioned capacity relation such as to promote uniform input to the header with substantial pressure and volume balance interiorly of the header, and an off-duct equivalent in capacity to the combined outflow potential at the open greater ends of the headers connected in flow communication with all of the latter to receive in common the vapor delivery therefrom.

9. The organization according to claim 8, together with means selectively applicable to renovate the interiors of said headers and tubes during sustained operation of the system.

10. The organization according to claim 8, together with means establishing a valve-controlled access passage to individual said tubes adjacent their conjunctions with the associated headers and separate means for the regulable ejection of fluid under pressure insertable through a selectively-opened such access passage for manipulation with renovating effect upon contiguous interior areas of the header and tube.

11. The organization according to claim 8, wherein charge-infeed conduits upstand in spaced relation from intersection with the kiln end closure amid and between the multiple openings therein and the said headers are conformed for emplacement among and about said conduits out of conjunction therewith.

12. The organization according to claim 8, wherein charge-infeed conduits upstand in spaced relation from intersection with the kiln end closure amid and between the multiple openings therein and the said headers are conformed for emplacement among and about said conduits out of conjunction therewith in a convergent juxtaposition of the header delivery ends.

13. The organization according to claim 8, wherein the openings accommodating vapor uprise through the end closure of the kiln are of like size in a number and arrangement substantially appropriating the effective transverse area of said closure.

14. The organization according to claim 8, wherein said headers are transversely rectangular in a progressive longitudinal enlargement of width and depth establishing the increase of header capacity correlative to the capability of inlet thereto.

15. In a shaft kiln having a transverse upper end closure formed with multiple openings in spaced apart relation affording uprise passage for the vapor products of kiln operation, means for accumulating the entire vapor uprise through said openings effective to promote substantial uniformity of input pressure at each thereof, and associated means for subducting the collected vapor at substantially unaltered pressure.

16. The organization according to claim 15, wherein said means for accumulating the vapors of kiln operation uprising through the openings in the kiln end closure comprises independent complementary headers of longitudinally-graduated capacity superjacent said end closure in flow communication with proximate openings such as to so connect all of the openings for input to the headers, said headers being individually proportioned in capacity to the associated input capabilities to reflect from a closed lesser end and to a greater open discharge end the combined input potential progressively connected thereto, whereby to establish at the open discharge end of each said header an output potential approximating the entire input capability serving the header.

17. The organization according to claim 15, wherein said means for accumulating the vapors of kiln operation uprising through the openings in the kiln end closure comprises independent complementary headers of longitudinally-graduated capacity superjacent said end closure in flow communication with proximate openings such as to so connect all of the openings for input to the headers, said headers being individually proportioned in capacity to the associated input capabilities to reflect from a closed lesser end to a greater open discharge end the combined input potential progressively connected thereto, whereby to establish at the open discharge end of each said header an output potential approximating the entire input capability serving the header, and the associated means for subducting the accumulated vapor comprises an off-duct of flow capacity approximating the combined output potential of all said headers connected with and to receive the delivery from the several discharge ends thereof.

18. The organization according to claim 15, wherein said means for accumulating the vapors of kiln operation uprising through the openings in the kiln end closure comprises independent complementary headers of longitudinally-graduated capacity superjacent said end closure, a tube connecting each said opening in flow communication with a proximate header, and a valve-controlled access passage for the accommodation of renovating means adjacent the conjunction of each said tube and header.

19. A system for the collection of off-gas products of shaft kiln operation uprising through multiple openings in an upper end closure transverse of the kiln comprising independent complementary headers connected with and to accumulate the vapor delivery from all of said openings and an off-duct connected with and to receive the vapor output from all of said headers, said system being distinguished by a capacity-graduation of the headers reflecting the input capabilities progressively applied thereto and an off-duct capacity approximating the combined output potential of the associated headers.

References Cited by the Examiner
UNITED STATES PATENTS

| | | | |
|---|---|---|---|
| 637,423 | 11/49 | Tschernoff | 266—31 |
| 1,555,783 | 9/25 | Franchot | 266—31 |
| 2,068,882 | 1/37 | Walker | 263—30 X |
| 2,601,041 | 6/52 | Logan | 122—390 |
| 2,857,108 | 10/58 | Wallace | 237—53 |
| 3,061,293 | 10/62 | Jones | 263—29 |

FOREIGN PATENTS 513,132  10/39  Great Britain.

CHARLES SUKALO, *Primary Examiner.*